United States Patent [19]

Scher

[11] Patent Number: 4,500,494

[45] Date of Patent: Feb. 19, 1985

[54] MICROENCAPSULATED CHELATING AGENTS AND THEIR USE IN REMOVING METAL IONS FROM AQUEOUS SOLUTIONS

[75] Inventor: Herbert B. Scher, Moraga, Calif.

[73] Assignee: Stauffer Chemical Company, Westport, Conn.

[21] Appl. No.: 560,771

[22] Filed: Dec. 12, 1983

Related U.S. Application Data

[63] Continuation of Ser. No. 467,702, Feb. 18, 1983, abandoned, which is a continuation of Ser. No. 278,309, Jun. 29, 1981, abandoned.

[51] Int. Cl.³ .................. B01D 15/00; C01G 5/00
[52] U.S. Cl. .................. 423/24; 423/658.5; 423/DIG. 14; 75/101 BE; 75/118 R; 210/638; 210/679; 210/688; 424/32; 428/402.21
[58] Field of Search ......... 423/24, DIG. 14, 658.5; 75/118 R, 101 BE; 252/316, 426; 424/32; 210/638, 679, 688

[56] References Cited

U.S. PATENT DOCUMENTS

| | | | |
|---|---|---|---|
| 3,250,704 | 5/1966 | Levendusky | 210/686 |
| 3,432,327 | 3/1969 | Kan | 252/316 |
| 3,516,941 | 6/1970 | Matson | 424/32 |
| 3,577,515 | 5/1971 | Vandegser | 424/32 |
| 3,732,141 | 5/1973 | Brockett | 252/316 |
| 3,947,354 | 3/1976 | Swanson | 210/53 |
| 3,960,762 | 6/1976 | Kroebel | 423/DIG. 14 |
| 3,979,286 | 9/1976 | Wing | 210/38 B |
| 4,051,316 | 9/1977 | Wing | 536/107 |
| 4,138,362 | 2/1979 | Vassiliades | 252/316 |
| 4,140,516 | 2/1979 | Scher | 424/32 |
| 4,220,726 | 9/1980 | Warshowsky | 252/426 |
| 4,238,328 | 12/1980 | Bowes | 210/688 |
| 4,238,329 | 12/1980 | Zievers | 210/36 |

OTHER PUBLICATIONS

Kondo, *Microcapsule Processing and Technology* Marcel Pekken N.Y. (1979) p. 1819.
Kordosky "The Chemistry of Metals Recovery Using LIX Reagents" 1979) Henkel Corp. pp. 3–31.
Warshowsky, Paper Presented at ISEC, Toronto, 1977 (pp. 1, 2, Bibliography).

*Primary Examiner*—John Doll
*Assistant Examiner*—Robert L. Stoll
*Attorney, Agent, or Firm*—Paul R. Martin; M. Henry Heines

[57] ABSTRACT

Novel polyurea and urea-formaldehyde microcapsules are disclosed which enclose a chelsating agent selected from β-diketones, 8-hydroxyquinolines and their thiol analogs, and oximes. The microcapsules are capable of removing metal ions from water.

14 Claims, No Drawings

MICROENCAPSULATED CHELATING AGENTS AND THEIR USE IN REMOVING METAL IONS FROM AQUEOUS SOLUTIONS

CROSS REFERENCE TO RELATED APPLICATIONS

This application is a continuation of U.S. Ser. No. 467,702, filed Feb. 18, 1983, which in turn is a continuation of U.S. Ser. No. 278,309, filed June 29, 1981, both now abandoned.

BACKGROUND OF THE INVENTION

A. Field of the Invention

This invention relates to microcapsules and to a method of use. In particular, this invention relates to chelating agents encapsulated in porous microscopic polymer shells, and to the use of these encapsulated chelating agents in removing metal ions from aqueous solutions.

B. Description of the Prior Art

Chelating agents are well known for their usefulness in both theoretical and applied chemistry and allied fields. Common uses include both qualitative and quantitative analyses as well as the softening of water, catalysis, and clarification of solutions. Chelating agents are particularly useful for the treatment of aqueous effluents to remove metallic impurities.

Chelating agents are traditionally used in either liquid ion exchange systems or in packed columns. In the former, an organic solution containing the chelating agent is placed in intimate contact with the aqueous solution and the removal of metallic ions is achieved when the two phases are separated. Unfortunately, it is often difficult to achieve a clean separation of the phases, and some loss of organic solvent invariably results. In the latter, the aqueous solution is passed through a column or "bed" of solid chelating resin, which is often mixed with a solid inert carrier. Such a process is often diffusion limited and requires large size equipment and a long residence time.

The object of the present invention is to provide an efficient system for metal ion removal which is free of these problems.

SUMMARY OF THE INVENTION

It has now been discovered that chelating agents encapsulated in polyurea or urea-formaldehyde shells are capable of removing metal ions from aqueous solutions. Whereas prior art chelating techniques involve direct contact between the chelating agent and the metal ion, the present invention represents the first attempt at forming metal chelates using a liquid chelating agent immobilized behind a mechanical barrier. The result is a high surface area system which, unlike the prior art, is neither diffusion limited nor plagued by phase separation difficulties, yet still removes metal ions by forming chelates within the capsules. This invention has the further advantage of enabling one to use liquid chelating agents in systems where solids are normally required, e.g., packed columns.

Accordingly, the present invention resides in a composition useful for removing metal ions from aqueous solutions which comprises microcapsules which in turn comprise a liquid core material, which is substantially insoluble in water, consisting essentially of a solution of a chelating agent selected from the group consisting of β-dike-tones, 8-hydroxyquinolines or their thiol analogs, and oximes, enclosed within a solid, permeable shell of a material selected from the group consisting of polyurea and urea-formaldehyde resins.

This invention further resides in a process for removing metal ions from an aqueous solution which comprises (a) contacting said solution with a composition comprising microcapsules according to the above description, and (b) separating said microcapsules from said solution.

DESCRIPTION OF THE PREFERRED EMBODIMENTS

The present invention is readily adaptable to variations in the aqueous solution to be treated, in the materials available for use, and in economic factors in general. As the following indicates, the essential and optional features of both the composition and its use in removing metal ions from water can all be varied extensively.

A. The Composition

The encapsulated chelating agent can be any conventional type including bidentate, tridentate, and quadridentate materials, provided that the agent be either a liquid itself or a solution, and substantially insoluble in water. This limitation permits the microcapsules to extract metal ions from water without releasing either the chelating agent or the resulting metal chelate. The aqueous solution remaining when the microcapsules are removed is then free of metal ion. Preferably, the water solubilities of the chelating agent and the solvent (when one is present) are 5000 ppm each (parts per million by weight) or less (under ambient conditions).

For microcapsules which are conveniently and efficiently prepared, preferred chelating agents are those which are compatible with the precursor material (or "prepolymer") used to form the microcapsule wall. Compatibility is measured in terms of both reactivity and solubility, since in the preferred process for preparing the capsules, both chelating agent and prepolymer reside in a single organic solution before the microcapsule is formed. Reactivity between the two should be a minimum, leaving each to perform its respective function. Regarding solubility, neither should impede the solubility of the other—they should be mutually soluble or both soluble in the solvent if a solvent is present.

Finally, the chelating agent should be properly selected to meet the needs of the environment in which it is used. Thus, it should be capable of forming a complex with the metal ion sought to be extracted. If a composition which can be regenerated is desired, the chelating agent should also be capable of releasing the metal ion under acidic conditions without itself being extracted from the microcapsule. If it is desired to extract a single type of metal ion from a solution containing two or more distinct solute species, the chelating agent should further be capable of making such a selection, typically by a proper adjustment of pH. The types of selection referred to in this paragraph are well within the knowledge of those skilled in chelate chemistry, and the regeneration and selectivity characteristics are optional to the present invention.

The preferred chelating agents fall within three classes—β-diketones, 8-hydroxyquinolines, and oximes.

Preferred β-diketones are those having the formula

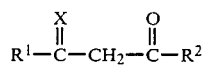

in which $R^1$ is selected from the group consisting of $C_3$–$C_{12}$ alkyl, phenyl, furyl, and thiofuryl, $R^2$ is selected from the group consisting of $C_1$–$C_{12}$ alkyl, trifluoromethyl, phenyl, furyl, and thiofuryl, and X is oxygen or sulfur. These compounds frequently exist in equilibrium with their enolic counterparts

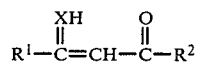

are are sometimes stable only in the enolic form. Examples of suitable β-diketones include
dibutyrylmethane—$R^1 = n$—$C_3H_7$, $R^2 = n$—$C_3H_7$ X=O
di(2,2-dimethylpropionyl)methane—$R^1 = C(CH_3)$, $R^2 = C(CH_3)_3$, X=O
dipentanoylmethane—$R^1 = n$—$C_4H_9$, $R^2 = n$—$C_4H_9$, X=O
benzoylacetone—$R^1 = $ phenyl, $R^2 = CH_3$, X=O
benzoyltrifluoroacetone—$R^1 = $ phenyl, $R^2 = CF_3$, X=O
dibenzoylmethane—$R^1 = $ phenyl, $R^2 = $ phenyl, X=O
furoyltrifluoroacetone—$R^1 = $ 2-furyl, $R^2 = CF_3$, X=O
thenoyltrifluroacetone—$R^1 = $ 2-thiofuryl, $R^2 = CF_3$, X=O
thiothenoyltrifluoroacetone—$R^1 = $ 2-thiofuryl, $R^2 = CF_3$, X=S, existing entirely in the enolic form
dithenoylmethane—$R^1 = $ 2-thiofuryl, $R^2 = $ 2-thiofuryl, X=O
and 2-furoyl-benzoylmethane—$R^1 = $ 2-furyl, $R^2 = $ phenyl, X=O.

Preferred 8-hydroxyquinolines or their thiol analogs are those having the formula

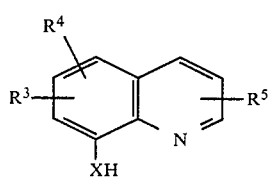

in which $R^3$, $R^4$, and $R^5$ are independently selected from the group consisting of hydrogen, halogen, $C_1$–$C_3$ alkyl, nitro (—$NO_2$), nitroso (—NO), sulfo (—$SO_3H$), and trialkylammonium salts of sulfo, and X is oxygen or sulfur. Common examples include the following (where the points of substitution on the aromatic rings are numbered counter-clockwise, starting at the nitrogen atom):
8-hydroxyquinoline itself (also known as "oxine")—$R^3 = R^4 = R^5 = H$, X=O
5,7-dichloro-8-hydroxyquinoline—$R^3 = 7$-Cl, $R^4 = 5$-Cl, $R^5 = H$, X=O
5,7-dibromo-8-hydroxyquinoline—$R^3 = 7$-Br, $R^4 = 5$-Br, $R^5 = H$, X=O
5,7-diiodo-8-hydroxyquinoline—$R^3 = 7$-I, $R^4 = 5$-I, $R^5 = H$, X=O
5,7-dinitro-8-hydroxyquinoline—$R^3 = $-$NO_2$, $R^4 = 5$-$NO_2$, $R^5 = H$, X=O
5-nitroso-8-hydroxyquinoline—$R^3 = 5$-NO, $R^4 = H$, $R^5 = H$, X=O
2-methyl-8-hydroxyquinoline (also known as "8-hydroxyquinaldine")—$R^3 = H$, $R^4 = H$, $R^5 = 2$-$CH_3$, X=O
4-methyl-8-hydroxyquinoline—$R^3 = H$, $R^4 = H$, $R^5 = 4$-$CH_3$, X=O
5-methyl-8-hydroxyquinoline—$R^3 = 5$-$CH_3$, $R^4 = H$, $R^5 = H$, X=O
8-mercaptoquinoline—$R^3 = R^4 = R^5 = H$, X=S
and 7-iodo-8-hydroxyquinoline-5-sulphonic acid—$R^3 = 7$-I, $R^4 = 5$-$SO_3H$, $R^5 = H$, X=S) and its tributylammonium salt.

Preferred oximes are hydroxy-substituted oximes of the formula

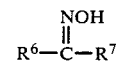

in which $R^6$ is selected from the group consisting of hydrogen, $C_1$–$C_3$ alkyl, and phenyl, and $R^7$ is selected from the group consisting of $C_1$–$C_3$ hydroxyalkyl, α-hydroxybenzyl, and hydroxyphenyl; and dioximes of the formula

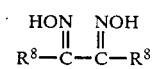

in which $R^8$ is selected from the group consisting of $C_1$–$C_3$ alkyl, phenyl, and furyl. Examples of hydroxy-substituted oximes are
salicylaldoxime—$R^6 = H$, $R^7 = 2$-hydroxyphenyl
and α-benzoinoxime—$R^6 = $ phenyl, $R^7 = $ α-hydroxybenzyl
Examples of dioximes are
dimethylglyoxime—$R^8 = CH_3$
α-furildioxime—$R^8 = 2$-furyl
and α-benzildioxime—$R^8 = $ phenyl.

Hydroxy-substituted oximes are the most preferred of the oximes, particularly those in which $R^6$ is hydrogen or $C_1$–$C_3$ alkyl and $R^7$ is hydroxyphenyl.

The term "alkyl" is used herein to include both straight-chain and branched-chain groups. All carbon atom ranges are inclusive of their upper and lower limits. The term "halogen" is used herein to include fluorine, chlorine, bromine, and iodine. Preferred halogens are chlorine, bromine, and iodine, with chlorine particularly preferred.

For microcapsules with polyurea shells, 8-hydroxyquinolines and β-diketones are the preferred chelating agents since they have the least tendency to react prior to encapsulation with the polyisocyanates which comprise the wall-forming prepolymers. For microcapsules with ureaformaldehyde shells, all types of chelating agents can be used without danger of reacting with the prepolymers. When microcapsule regeneration is desired, β-diketones are the preferred chelating agents since acidification of the dispersion (which reverses the chelation reaction) will not cause extraction of the β-diketones from the capsules into the aqueous phase. It should be remembered, however, that chelate microcapsules can perform many valuable functions without being regenerated.

When a liquid chelating agent is used, a solvent is not necessary. Since most chelating agents useful in this invention are solids under ambient conditions, however, an inert solvent which is substantially insoluble in water will normally be used. As mentioned above, the solvent is preferably one with a solubility of 5000 ppm or less. Examples include aromatic hydrocarbons and halogenated aromatic hydrocarbons such as benzene, toluene, xylene, heavy aromatic naphtha, chlorobenzene, and dichlorobenzenes; chlorinated hydrocarbons such as chloroform, carbon tetrachloride, dichloroethanes, and trichloroethanes; ketones such as butymethylketone; esters such as amyl acetate, isoamyl acetate, hexyl acetate, isohexyl acetate, sec-butyl acetate; alcohols such as 2-methylbutanol-2, 2,2-dimethyl-propanol-1, n-hexyl alcohol, 2,2-dimethylbutanol-3, 2-methyl-pentanol-1, and n-heptanol. Preferred solvents are aromatic hydrocarbons, chlorinated aromatic hydrocarbons, and chlorinated hydrocarbons.

In a preferred embodiment of the invention, the microcapsules are of the type formed by interfacial polycondensation, or polymerization of the wall-forming materials at the interface formed when droplets of the chelating agent solution are dispersed in an aqueous medium. Localized reaction at the interface is brought about by the placement of one of two wall-forming reactants in the dispersed phase and the other in the continuous phase, or by the placement of a reactant (or "prepolymer") in the dispersed phase and a polymerization catalyst in the continuous phase. This technique, described further below, requires that a wall-forming material be dissolved in the chelating agent or the chelating agent solution. In this embodiment, therefore, the solvent should be inert to the wall-forming material, and should have solubility properties conducive to keeping the wall-forming reaction at the interface. This is particularly significant when the wall-forming material is a urea-formaldehyde prepolymer which has been etherified to render it soluble in the organic phase. As explained below, the reaction occurs when protons come in contact with the prepolymer. The solvent must be sufficiently hydrophilic to attract hydrated protons to the interface from the aqueous phase, yet sufficiently hydrophobic to prevent large amounts of protons from crossing the interface and causing polymerization inside the droplet itself. Since this is largely a question of degree, the need for one type or the other depends on the hydrophilic or hydrophobic nature of the chelating agent. Aromatic and aliphatic solvents are examples of hydrophobic solvents, and alcohols and ketones are examples of hydrophilic solvents. Both the solvent and its amount can thus be selected as needed to counterbalance the nature of the chelating agent.

Etherified urea-formaldehyde prepolymers are often predissolved in solvents to lessen the degree of hydrogen bonding between the hydroxyl groups. When such solvents meet the additional requirements outlined above, they are also suitable for use in the present composition. Polar organic solvents in general are useful in this regard, including alcohols, ketones, esters, and aromatics. When etherifying agents of high chain length are used, aliphatics and other non-polar solvents can also be used. The most useful solvents are the same alcohols used as the etherifying agents, the solution being taken directly from the reaction mixture of the etherification process.

The concentration of the chelating agent when a solvent is present is not critical to the invention and can vary over a wide range. Selection of an appropriate concentration will depend on the solubility of the chelating agent, the desired mole ratio of chelating agent to metal ion being extracted, and economic factors in general. It will be most convenient, however, to use a concentration ranging from about 5% to about 70% on a weight basis, preferably from about 10% to about 50%.

The polymer shell which forms the microcapsule is selected from two general types of polymer materials—polyureas and urea-formaldehyde polymers.

Polyureas are defined as those polymers formed by polymerization of an organic isocyanate. Organic isocyanates suitable for polymerization include conventional aliphatic, alicyclic, and aromatic isocyanates. Aromatic isocyanates are preferred. Examples of suitable isocyanates are:
hexamethylene-1,6-diisocyanate
1-chloro-2,4-phenylene diisocyanate
m-phenylene diisocyanate
p-phenylene diisocyanate
4,4'-methylene-bis(phenyl isocyanate)
2,4-toluene diisocyanate
2,6-toluene diisocyanate
3,3'-dimethyl-4,4-biphenylene diisocyanate
4,4'-methylene bis(2-methylphenyl isocyanate
3,3'-dimethoxy-4,4'-biphenylene diisocyanate
2,2',5,5'-tetramethyl-4,4'-biphenylene diisocyanate
1,5-naphthalene diisocyanate
Polymeric isocyanates can also be used. One example is polymethylene polyphenylisocyanate, two forms of which are sold under the trade names "Mondur MRS®" (Mobay Chemical Corporation, Pittsburgh, Penna., and "PAPI®" (The Upjohn Company, Kalamazoo, Mich). Some polyisocyanates are particularly effective in combinations of two or more. One example is an 80:20 weight percent blend of the 2,4- and 2,6-isomers of toluene diisocyanate. Another example is a 65:35 weight percent blend. These combinations are commerially available under trade names such as "Hylene TM®" (E.I. Depont de Nemours & Co., Inc., "Nacconate 80®" (Allied Chemical Corporation, Morris Township, N.J.), and Mondur TD-80 ®" (Mobay Chemical Company). Combinations of diisocyanates and polymeric isocyanates are also highly effective. One example is 2,4-toluene diisocyanate and PAPI. Addition products of polyisocyanates and polyols to form isocyanate prepolymers are also useful. Examples include:
hexamethylene diisocyanate and hexanetriol
2,4-toluene diisocyanate and benzocatechol
2,4-toluene diisocyanate and hexanetriol
2,4-toluene diisocyanate and trimethylol propane
xylylene diisocyanate and trimethylol propane
A further listing of useful commercially available polyisocyanates is found in the *Encyclopedia of Chemical Technology*, Kirk and Othmer, Second Edition, Volume 12, Interscience Publishers (1967) at pages 46–47, and a further description of the microencapsulation process using isocyanates and polyisocyanates is found in Scher, U.S. Pat. No. 4,140,516 (Feb. 20, 1979) and commonly assigned U.S. Pat. application Ser. No. 922,473, filed July 7, 1978.

As an optional variation in the preparation of polyurea microcapsules, catalysts can be used to enhance the polymerization reaction. Catalysts for this reaction include tertiary amines, alkyl tin carboxylates, quaternary ammonium salts, alkali formates, alkali acetates, alkali carbonates, alkali borohydrides, alkali hydroxides, and alkali alkoxides. In general, the isocyanate resides in the droplet itself since it is insoluble in water, and the catalyst resides in the aqueous phase. Since polymerization occurs by reaction between an isocyanate group and a water molecule, the reaction occurs at the interface when the organic phase is dispersed in the aqueous phase.

Urea-formaldehyde polymers comprise two types—those formed from non-etherified water-soluble prepolymers and those formed from etherified prepolymers which preferentially dissolve in organic solvents.

In the former, the prepolymer resides in the aqueous phase. Various methods have been devised to cause the material to polymerize and deposit itself around and thus encapsulate organic droplets in a dispersion. An example of one such method is found in Matson, U.S. Pat. No. 3,516,941 (June 23, 1970).

In the latter, the prepolymer resides in the organic phase, i.e., within the droplet itself. This is the preferred type of urea-formaldehyde polymer. Encapsulation is achieved by dispersing the organic phase in the aqueous phase and acidifying the aqueous phase. Polymerization results at the interface.

In its non-etherified form, the prepolymer contains a large number of methylol groups, $-CH_2OH$, in its molecular structure. Etherification is the replacement of the hydroxyl hydrogens with alkyl groups, and is achieved by condensation of the prepolymer with an alcohol. When the alkyl groups comprise four carbon atoms or more and they have replaced more than about 50% of the hydroxyl hydrogen atoms on the prepolymer molecule, the prepolymer becomes soluble in the organic phase. Complete etherification is to be avoided, however, since hydroxyl groups are needed for the polymerization which occurs in the wall-forming step. Therefore, useful prepolymers have from about 50% to about 98% of the hydroxyl hydrogen atoms replaced by alkyl groups of 4 to 10 carbon atoms each. In preferred practice, about 70% to about 90% of the groups have been etherified with a $C_4$–$C_6$ alcohol. Both straight-chain and branched-chain alcohols can be used.

As mentioned above, etherification urea-formaldehyde prepolymers are commercially available as solutions in alcohol or in a mixture of alcohol and xylene. The alcohol used as the solven is normally identical to that used as the etherifying agent. Those in most common use are n-butanol and iso-butanol. The degree of etherification (butylation) in these commercial products ranges between 70% to 90%, and the solution contains from 50% to 85% by weight of prepolymer. Minor amounts of free formaldehyde are also frequently present. These solutions are typically sold as cross-linking agents for alkyd resins and used primarily for the formulation of coating and finishing products such as paints and lacquers.

Urea-formaldehyde prepolymers which have not been etherified are also available commercially, either in aqueous solutions or as water-dissolvable solids, for use as adhesives. These can be etherified by condensation with the desired alcohol in a weakly acidic alcohol solution. The water of condensation is distilled off as an azeotrope with the alcohol until the desired degree of condensation (etherification) has been reached.

Urea-formaldehyde prepolymers themselves can be prepared by known techniques, notable the base-catalyzed reaction between urea and formaldehyde in water at a weight ratio of 0.6 to 1.3 parts formaldehyde to one part urea by weight (1.2:1 to 2.6:1 on a molar basis), at a pH of 7.5 to 11.0 and a temperature of 50° C. to 90° C. Etherification is then accomplished in the manner described above.

The degree of etherification can be monitored by the quality of water driven off during the distillation. Although the degree of etherification can be varied over a wide range to accomodate the needs of the reaction system, the rate of polymerization in the subsequent wall-forming step decreases as the degree of etherification increases. Too high a degree of etherification, therefore, tends to inhibit the progress of the wall formation. Too low a degree of etherification, however, tends to increase the water solubility of the prepolymer. A proper balance is therefore desirable, hence the ranges recited above.

The concentration of the prepolymer in the droplet is not critical and can vary over a wide range depending on the desired capsule strength and the desired quantity of chelating agent solution in the finished capsule. It will be most convenient, however, to use an organic phase with a prepolymer concentration of from about 1% to about 70% on a weight basis, preferably from about 5% to about 50%. Capsules with wall materials of this type are described in commonly assigned co-pending U.S. patent application Ser. No. 201,686, filed Oct. 30, 1980.

Regardless of the nature of the wall material, the size of the finished microcapsules is not critical to the invention. Most conveniently, the capsules will have a diameter ranging from about 0.5 microns to about 400 microns, preferably from about 1 micron to about 100 microns.

The finished composition can either be filtered and handled as a paste or dry cake. If it is left in dispersion form, suspension stability can be enhanced by the use of suspending clays or polymers. It can then be added directly to the aqueous solution to be treated, where it will readily disperse. Storage and handling will be simplified, however, if the composition is transformed into a paste once the microcapsules have been formed.

B. Use of the Composition

Metal ions suitable for extraction by the present composition include all metal ions capable of combining with chelating agents of the above description to form metal chelates with a small solubility in water compared to their solubility in water-immiscible organic solvents. Preferred metals are those with an oxidation number of 2 or greater and an atomic weight grearter than that of sodium (22.9). Examples include Cu(II), Fe(II), Fe(III), Co, Ni, Al, Zn, Ca, Sc, Ti, V, Mn, Zr, Mo, Pd, Ag, and Cd. Particularly preferred examples are Fe(II), Fe(III), Co, Ni, and Cu(II).

The mole ratio of chelating agent to metal ion in the extraction process is not critical to the invention, and can vary over a wide range, depending on how much of the dissolved metal is sought to be extracted, what type of process is used (batch or continuous, dispersion or packed column), the type and permeability of the shell wall material, the equilibrium distribution coefficient of the metal chelate between the aqueous and organic phases, and economic factors in general. It is preferred that the ratio be greater than or equal to the stoichiometric ratio for formation of the chelate. The stiochiometric ratio depends on both the nature of the chelating agent (bidentate, tridentate, or quadridentate), the coordination number of the metal. The ratio actually used in the process will further depend on the position of equilibrium of the chelating reaction (i.e., the stability of the resulting chelate). As an example of the typical system, a bidentate chelating agent and a metal with a coordination number of 2 will have a stoichiometric mole ratio of 2. 8-Hydroxyquinoline, thenoyltrifluoroacetone, and salicylaldoxime are examples of bidentate chelating agents, and Fe(II), Cu(II), Zu, and Ag are examples of metal ions with a coordination number of 2. Particularly preferred mole ratios are those extending from about stoichiometric to about twenty times stoichiometric. The desired ratio can be achieved by varying the loading of the microcapsules (i.e., the concentration of chelating agent in the organic solution) or the quantity of microcapsules used per volume of the aqueous solution to be treated (concentration of the dispersion in a bath process, or liquid flow rate or proportion of microcapsules to inert support in a packed column.

The pH of the aqueous solution during the extraction process is also variable and noncritical, and its selection will depend on both the type of chelating agent used and the metal being extracted. Some chelating agents, such as 8-hydroxyquinoline and its derivative, are useful only at a pH greater than about 5.0 since they protonate at low pH and become soluble in water. The result is a reverse extraction of the chelating agent out of the microcapsule into the surrounding water, defeating the process. Other chelating agents, particularly β-diketones, can be used at a lower pH without protonation taking place. With some β-diketones, pH control can be used to advantage for the selective extraction of certain metals over others. Sequential extractions at different pH values can be performed to separate different metal ions from each other by individual extraction. Further, many chelation reactions can be reversed by a lowering of pH, thus permitting regeneration of the chelating agent and release of the metal ion. In general, the preferred pH during the extraction process will range from about 5.0 to about 7.0.

The temperature of the extraction process is not critical. The process will be most conveniently performed at ambient temperature.

The process can be conducted either on a batchwise or continuous basis. A batchwise process will normally comprise the formation of a dispersion of the microcapsules in the aqueous solution to be treated, with sufficient agitation to provide maximum contact between the microcapsules and the solution, followed by removal of the microcapsules by filtration, centifuging, or other appropriate means. Such removal constitutes the final separation step of the process and can be achieved by any conventional means, with the optical use of addition components, such as floccuating agents or settling agents. A continuous process can also involve the formation of a dispersion, with recycling of the microcapsules to treat fresh solution. Alternatively, a continuous process can comprise a packed column in which the microcapsules are distributed through a bed of inert support material, such as diatomaceous earth, alumina, silica gel, etc., in order to permit the flow of the aqueous solution therethrough. In a packed column configuration, no separate separation step to remove the microcapsules from the aqueous solution is required, since extraction and separation occur simultaneously as the liquid flows through and out of the column.

Regeneration of the chelating agent is possible in many systems by acidification of the surrounding medium. Thus, once an extraction has been performed and the microcapsules are separated from the aqueous solution, they can be placed in second aqueous solution of low pH, preferably from about 0.5 to 4.0, most preferably from about 0.5 to about 2.0, whereupon the metal ions in the chelate molecules will be replaced by hydrogen atoms and will thus pass through the capsule walls into the aqueous solution. The metal ions can then be recovered from the aqueous solution if desired. The microcapsules containing regenerated chelating agent can them be recoved for use in the treatment of a fresh aqueous solution of metal ion. As mentioned above, however, certain chelating agents will also pass though the capsule walls upon acidification. When regeneration is desired, therefore, care must be taken in the selection of the chelating agent to avoid those with this property.

Many variations of the composition and process described above will be apparent to those skilled in the art. It is not intended that the scope of the present invention be limited by the specific examples described above.

The following examples are offered to further illustrate the composition of the present invention and its use in removing metal ions from aqueous solutions. These examples are intended neither to define nor limit the invention in any manner.

EXAMPLE 1

This example illustrates the formation of polyurea microcapsules of the chelating agent 8-hydroxyquinoline (oxine) and their use in removing cupric ions from an aqueous solution of cupric sulfate.

A. Microcapsule Formation

An organic solution was prepared by dissolving 8-hydroxyquinoline in HI-SOL ® 4-3 to produce a 10 weight percent solution. To 247.6 parts (all "parts" herein are parts by weight) of this solution were added 18.4 parts of PAPI ® and 9.2 parts of toluene diisocyanate (80:20 bend of 2,4- and 2,6-isomers). HI-SOL 4-3 is a heavy aromatic naphtha with a boiling temperature range of 238° C. to 286° C., a product of Ashland Chemical Company, Industrial Chemicals and Solvents Division, Columbus, Ohio. PAPI is a polymethylene polyphenylisocyanate, a product of the Upjohn Company, Kalamazoo, Mich.

The solution was then dispersed in 400 parts of an aqueous solution containing 2.0% Vinol ® 205 and 0.3% Tergitol ® 15-S-7 (all by weight). Vinol 205 is a polyvinyl alcohol protective colloid, a product of Air Products and Chemicals Inc., Allentown, Penna. Tergitol 15-S-7 is a nonionic surfactant consisting of a polyethylene glycol ether of a linear alcohol, a product of Union Carbide Chemicals and Plastics Company, New York, N.Y. The dispersion was formed in a high shear dispersion stirrer operated at 2600 revolutions per minute at room temperature until a droplet size of under 40 microns was achieved. The dispersion was then transferred to a low shear stirrer where stirring was continued for three hours at 50° C. The result was an aqueous dispersion of discrete, roughly spherical, fully enclosed capsules, which was then allowed to cool to room temperature.

B. Use in Metal Extraction

Ten parts of the dispersion formed in Section A were combined with 100 parts of an aqueous cupric sulfate solution containing 744 ppm (parts per million by weight) of cupric ion. The mole ratio of chelating agent to cupric ion was thus about 2, which is the stoichiometric ratio. The pH was maintained at 5.0–5.5 with a 1% sodium hydroxide solution and the mixture was stirred for one hour. The mixture was then filtered and the filtrate was analyzed for cupric ion content by atomic absorption. The result is shown in Table I, where the filtrate is designated by the code number 1-1.

In a separate extraction with the same chelating composition 100 parts of the same cupric sulfate solution were first treated in 1N sodium hydroxide to raise the pH to 9.1. Then 10.0 parts of the microcapsule dispersion were added (again a mole ratio of 2.0) and the pH dropped to 6.0. Dilute hydrochloric acid was added to lower the pH to 5.5 and the mixture was stirred for an hour. The mixture was then filtered and the filtrate was analyzed for its cupric ion content. The filtrate is designated in Table I as number 1-2.

In a third extraction, 10.0 parts of the curpic sulfate soution were combined with 0.2 parts of 1N sodium hydroxide and 10.0 parts of the microcapsule dispersion. This produced a mole ratio of 20 (ten times the stoichiometric.) After the pH stabilized at 4.9, it was raised to 5.5 with a 1.0% sodium hydroxide solution. The mixture was then stirred and filtered as before, and the filtrate was analyzed for its cupric ion content, designated in Table I as number 1-3. In each case, a large reduction in cupric ion content is evident.

TABLE I
$Cu^{++}$ REMOVAL USING POLYUREA CAPSULES OF 8-HYDROXYQUINOLINE (OXINE)

| Solution | Dispersion Mole Ratio (oxine:$Cu^{++}$) | Filtrate $Cu^{++}$ Content (ppm) | Percent $Cu^{++}$ Removal |
|---|---|---|---|
| Untreated | — | 744 | — |
| Treated: | | | |
| No. 1-1 | 2 | 141 | 81 |
| No. 1-2 | 2 | 81 | 89 |
| No. 1-3 | 20 | 3 | 99.6 |

EXAMPLE 2

This example illustrates the formation and use of polyurea microcapsules of Γ-diketone chelating agent, as well as the regeneration of the chelating agent.

A. Microcapsule Formation

An organic solution was prepared by combining 60 parts of LIX® 54 with 60 parts of HI-SOL 4-3, 8.9 parts of PAPI, and 4.4 parts of toluene diisocyanate (80:20 isomer blend). LIX-54 is a kerosene solution of β-diketones amounting to 40–50% by weight, a product of Henkel Corporation, Tucson, Ariz.

Following the procedure described in Example 1, the solution was dispersed in 220 parts of an aqueous solution containing 2.0% Gantez® AN119, 0.22% Vinol 205, and 0.3% Tergitol 15-S-7. Gantez AN119 is a hydrolyzed poly(methyl vinyl ether/maleic anhydride) protective colloid, a product of GAF Corporation, New York, N.Y. The pH was maintained at 4.5.

B. Use in Metal Extraction

Ten parts of the dispersion formed in Section A were combined with 100 parts of an aqueous solution of cupric sulfate containing 716 ppm cupric ion, a chelating agent/cupric ion mole ratio of about 2, the stoichiometric ratio. The pH was adjusted to 6.8 with 10% sodium hydroxide. After thirty minutes of stirring, the mixture was filtered and the cupric ion content of the filtrate was determined. The result is shown in Table II, where the filtrate is designated by the code number 2-1.

Similarly, ten parts of the dispersion were combined with ten parts of the cupric sulfate solution (a mole ratio of about 20, or ten times the stoichiometric), and the resulting mixture was pH adjusted with caustic, stirred and filtered in the same manner. The filtrate is shown as number 2-2.

Finally, the filter cake from filtrate No. 2-1 was mixed with 100 parts of water and the pH was lowered to 1.0 with 5% hydrochloric acid. The resulting dispersion was then filtered and the filtrate was analyzed for cupric ion. The result is also shown in the table.

It is clear from the table that most of the cupric ion was removed from the solution in each case. The result obtained by subsequent dispersion of the filter cake and acidification also indicate that the metal can then be released from the capsule to regenerate the chelating agent.

TABLE II
$Cu^{++}$ REMOVAL USING POLYUREA CAPSULES OF β-DIKETONE

| Solution | Dispersion Mole Ratio (diketone:$Cu^{++}$) | Filtrate $Cu^{++}$ Content (ppm) | Percent $Cu^{++}$ Removal |
|---|---|---|---|
| Untreated | — | 716 | — |
| Treated: | | | |
| No. 2-1 | 2 | 8.2 | 99 |
| No. 2-2 | 20 | 71 | — |
| From Regenerated Filter Cake From No. 2-1 | — | 585 | — |

EXAMPLE 3

This example illustrates the formation and use of urea-formaldhyde microcapsules containing salicylaldoxime as the chelating agent.

A. Microcapsule Formation

An organic solution was prepared by dissolving 3.4 parts of salicylaldoxime and 7.1 parts of Beetle® 1050-10 in 32 parts of xylene. Beetle 1050-10 is a 60% n-butanol solution of a partially butylated urea-formaldehyde prepolymer in which the degree of butylation is approximately 70–90%, a product of American Cyanamid Company, Resins Department, Wayne, N.J.

The solution was then dispersed in 297 parts of an aqueous solution containing 1.0% Gelvatol® 40-20, 0.5% Daxad® 23, and 0.5% Daxad 16. Gelvatol 40-20 is a polyvinyl alcohol protective colloid (degree of hydrolysis 73–77%) with an average molecular weight of about 3000, a product of Monsanto Company, Indian Orchard, Mass. Daxad 23 is a powdered anionic dispersant, identified as a sodium salt of polymerized alkyl and substituted benzoid alkyl sulfonic acids. Daxad 16 is a liquid anionic dispersant, identified as a 47.5% solution of a sodium salt of a polymerized alkyl naphthalene sulfonic acid. Both are products of W. R. Grace and Company, Organic Chemicals Division, Lexington, Mass. A high shear dispersion stirrer operating at 2000 revolutions per minute was used to form droplets of diameter equal to or less than 40 microns. The dispersion was then transferred to a paddle stirrer where 3 parts of Daxad LAA were added, lowering the pH to 1.7. The latter is an acidic dispersant, identified as a polymerized alkyl naphthalene sulfonic acid, also from W. R. Grace. The temperature was adjusted to 50° C. and stirring was continued for three hours. The resulting microcapsule dispersion was then permitted to cool to room temperature.

In a separate preparation, the same procedure was followed except that chlorobenzene was substituted for xylene. The microcapsule dispersion resulting from this preparation was then permitted to cool.

B. Use in Metal Extraction

The dispersion with the xylene solvent was centrifuged and the microcapsule layer, having collected at the top, was removed. To 3.5 ml of the microcapsules was added 100 g of a cupric sulfate solution containing 740 ppm cupric ion. The mole ratio of chelating agent to cupric ion in this mixture was 2. The pH was adjusted to 5.5 with 1% sodium hydroxide and the resulting mixture was stirred for 45 minutes, then filtered. The filtrate was analyzed as in the previous examples and the result is shown in Table III under the designation 3-1.

The extraction was repeated using 10 grams of the cupric sulfate solution rather than 100, for a chelating agent/cupric ion mole ratio of 20. The resulting filtrate is designated 3-2.

Both extractions were then performed using the microcapsules containing chlorobenzene as the solvent for the chelating agent. The resulting filtrates are designated 3-3 (mole ratio of 2) and 3-4 (mole ratio of 20).

In each case, a large redution in cupric ion content was observed.

TABLE III $Cu^{++}$ REMOVAL USING UREA-FORMALDEHYDE OF SALICYLADOXIME

| Solution | Solvent In Capsule | Dispersion Mole Ratio (oxime:$Cu^{++}$) | Filtrate $Cu^{++}$ Content (ppm) | Percent $Cu^{++}$ Removal |
|---|---|---|---|---|
| Untreated | — | — | 740 | — |
| Treated: | | | | |
| No. 3-1 | xylene | 2 | 530 | 29 |
| No. 3-2 | xylene | 20 | 120 | 85 |
| No. 3-3 | chlorobenzene | 2 | 450 | 40 |
| No. 3-4 | chlorobenzene | 20 | 210 | 72 |

What is claimed is:

1. A process for the purification of an aqueous solution containing metal ion impurities which comprises contacting said solution with a plurality of microcapsules, each comprising a liquid core material, which is substantially insoluble in water, consisting essentially of a metal ion chelating agent selected from the group consisting of -diketones, 8-hydroxyquinolines, and oximes, enclosed within a solid permeable shell of a material selected from the group consisting of polyurea and ureaformaldehyde resins, wherein said metal ion impurities pass through said shell of said microcapsules and are chelated by said chelating agents, and subsequently separating said microcapsules from said solution.

2. The method in accordance with claim 1 in which said chelating agent is dissolved in an inert organic solvent which is substantially insoluble in water.

3. The method in accordance with claim 1 in which said chelating agent is dissolved in an inert organic solvent which is substantially insoluble in water, and said chelating agent is selected from the group consisting of (a) β-diketones having the formula

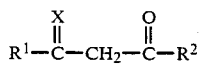

in which
R¹ is selected from the group consisting of $C_3$-$C_{12}$ alkyl, phenyl, furyl and thiofuryl;
R² is selected from the group consisting of $C_1$-$C_{12}$ alkyl, trifluoromethyl, phenyl, furyl, and thiofuryl; and
X is oxygen or sulfur;

(b) 8-hydroxyquinolines or their thiol analogs having the formula

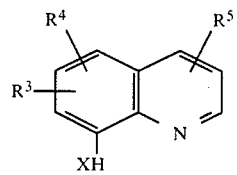

in which
R³, R⁴ and R⁵ are independently selected from the group consisting of hydrogen, halogen, $C_1$-$C_3$ alkyl, nitro, nitroso, sulfo and sulfo-trialkylammonium salts, and
X is oxygen or sulfur;

(c) oximes having the formula

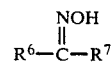

in which
R⁶ is selected from the group consisting of hydrogen, $C_1$-$C_3$ alkyl, and phenyl; and
R⁶ i selected from the group consisting of $C_1$-$C_3$ hydroxyalkyl, β-hydroxybenzyl and hydroxyphenyl; and (d) dioximes of the formula

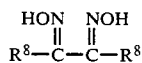

in which
R⁸ is selected from the group consisting of $C_1$-$C_3$ alkyl, phenyl and furyl.

4. The method according to claim 1 in which said chelating agent is dissolved in an inert organic solvent which is substantially insoluble in water, and said chelating agent is selected from the group consisting of 8-hydroxyquinoline, salicylaldoxime, and β-diketones having the formula

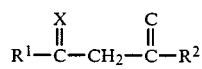

in which
R¹ is selected from the group consisting of $C_3$-$C_{12}$ alkyl, phenyl, furyl and thiofuryl;
R² is selected from the group consisting of $C_1$-$C_{12}$ alkyl, trifluoromethyl, phenyl, furyl, and thiofuryl; and
X is oxygen or sulfur.

5. The method in accordance with claim 1 in which said chelating agent is 8-hydroxyquinoline dissolved in an inert organic solvent which is substantially insoluble in water, and said shell material is a polyurea resin.

6. The method in accordance with claim 1 in which said chelating agent is 8-hydroxyquinoline dissolved in an inert organic solvent which is substantially insoluble in water, and said shell material is a polyurea resin formed from an aromatic polyisocyante.

7. The method in accordance with claim 1 in which said chelating agent is 8-hydroxyquinoline dissolved in an inert organic solvent which is substantially insoluble in water, and said shell material is a polyurea resin formed from a mixture of a polymethylene polyphenylisocyanate and toluene diisocyanate.

8. The method in accordance with claim 1 in which said chelating agent is salicylaldoxime dissolved in an inert organic solvent which is substantially insoluble in water, and said shell material is a urea-formaldehyde resin.

9. The method in accordance with claim 1 in which said chelating agent is salicyaldoxime dissolved in an inert organic solvent which is substantially insoluble in water, and said shell material is a urea-formaldehyde resin formed from a urea-formaldehyde prepolymer having from about 50% to about 98% of the hydroxyl hydrogen atoms replaced by $C_4$-$C_6$ alkyl groups.

10. The method in accordance with claim 1 in which said chelating agent is salicylaldoxime dissolved in an inert organic solvent which is substantially insoluble in water, and said shell material is a urea-formaldehyde resin formed from a urea-formaldehyde prepolymer having from about 70% to about 90% of the hydroxyl hydrogen atoms replaced by $C_4$-$C_6$ alkyl groups.

11. The method in accordance with claim 1 in which said chelating agent is salicylaldoxime dissolved in an inert organic solvent which is substantially insoluble in water, and said shell material is a urea-formaldehyde resin formed from a urea-formaldehyde prepolymer having from about 70% to about 90% of the hydroxyl hydrogen atoms replaced by a n-butyl group.

12. The method in accordance with claim 1 in which said chelating agent is a β-diketone having the formula

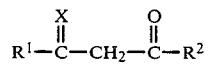

in which
R¹ is selected from the group consisting of $C_3$-$C_{12}$ alkyl, phenyl furyl and thiofuryl;
R² is selected from the group consisting of $C_1$-$C_{12}$ alkyl, trifluoromethyl, phenyl, furyl, and thiofuryl; and
X is oxygen or sulfur;
dissolved in an inert organic solvent which is substantially insoluble inwater, and said shell material is a polyurea resin.

13. The method in accordance with claim 1 in which said chelating agent is a β-diketone having the formula

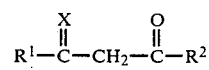

in which
R¹ is selected from the group consisting of $C_3$-$C_{12}$ alkyl, phenyl furyl and thiofuryl;
R² is selected from the group consisting of $C_1$-$C_{12}$ alkyl, trifluoromethyl, phenyl, furyl, and thiofuryl; and
X is oxygen or sulfur;
dissolved in an inert organic solvent which is substantially insoluble in water, and said shell material is a polyrea resin formed from an aromatic polyisocyanate.

14. A method for the retrieval of precious metals which comprises filtering an aqueous solution containing precious metal ions through a plurality of microcapsules, each, comprising a liquid core material, which is substantially insoluble in water, consisting essentially of a chelating agent selected from the group consisting of β-diketones, 8-hydroxyquinolines, and oximes, enclosed within a solid permeable shell of a material selected from the group consisting of polyurea and urea-formaldehyde resins, and subsequently separating said microcapsules from said solution.

* * * * *

UNITED STATES PATENT AND TRADEMARK OFFICE
CERTIFICATE OF CORRECTION

PATENT NO. : 4,500,494

DATED : February 19, 1985

INVENTOR(S) : Herbert B. Scher

It is certified that error appears in the above-identified patent and that said Letters Patent is hereby corrected as shown below:

In Column 7, line 35, the word "etherification" should read --- etherified ---.

In Column 7, line 66, the word "quality" should read --- quantity ---.

In Column 8, line 67, the word "Zu" should read --- Zn ---.

In Column 9, line 7, the word "bath" should read --- batch ---.

In Column 9, line 30, the number "7.0" should be deleted and the paragraph should continue with --- 10.0 with the most preferred from about 5 to about 7. ---

UNITED STATES PATENT AND TRADEMARK OFFICE
CERTIFICATE OF CORRECTION

PATENT NO. : 4,500,494           Page 2 of 2
DATED : February 19, 1985
INVENTOR(S) : Herbert B. Scher It is certified that error appears in the above-identified patent and that said Letters Patent is hereby corrected as shown below:

In Column 9, line 41, the word "optical" should read --- optional ---.

In Column 10, line 28, the word "bend" should read --- blend ---.

In Column 11, line 31, the word " -diketone" should read --- $\beta$ -diketone ---.

In Column 14, Claim 3, line 25, the phrase "$R^6$ i" should read --- $R^6$ is ---.

Signed and Sealed this

Sixth Day of May 1986

[SEAL]

Attest:

DONALD J. QUIGG

Attesting Officer      Commissioner of Patents and Trademarks